United States Patent
Niewczas et al.

(10) Patent No.: US 11,263,496 B2
(45) Date of Patent: Mar. 1, 2022

(54) METHODS AND SYSTEMS TO CLASSIFY FEATURES IN ELECTRONIC DESIGNS

(71) Applicant: D2S, Inc., San Jose, CA (US)

(72) Inventors: Mariusz Niewczas, San Jose, CA (US); Abhishek Shendre, Fremont, CA (US)

(73) Assignee: D2S, Inc., San Jose, CA (US)

( * ) Notice: Subject to any disclaimer, the term of this patent is extended or adjusted under 35 U.S.C. 154(b) by 83 days.

(21) Appl. No.: 16/793,390

(22) Filed: Feb. 18, 2020

(65) Prior Publication Data

US 2020/0272865 A1 Aug. 27, 2020

Related U.S. Application Data

(60) Provisional application No. 62/810,168, filed on Feb. 25, 2019.

(51) Int. Cl.
| | |
|---|---|
| *G06K 9/00* | (2006.01) |
| *G06K 9/62* | (2022.01) |
| *G06N 3/08* | (2006.01) |
| *G06T 7/00* | (2017.01) |

(52) U.S. Cl.
CPC ......... *G06K 9/6272* (2013.01); *G06N 3/088* (2013.01); *G06T 7/001* (2013.01); *G06T 7/0006* (2013.01); *G06T 2207/10061* (2013.01); *G06T 2207/20081* (2013.01); *G06T 2207/30148* (2013.01)

(58) Field of Classification Search
CPC .. G06K 9/6272; G06K 2209/19; G06K 9/627; G06N 3/088; G06N 3/0454; G06T 7/0006; G06T 7/001; G06T 2207/10061; G06T 2207/30148; G06T 2207/20081; G06T 2207/20084; G06T 2207/30121
See application file for complete search history.

(56) References Cited

U.S. PATENT DOCUMENTS

| | | |
|---|---|---|
| 6,501,083 B1 | 12/2002 | Kamijo |
| 8,938,696 B1 * | 1/2015 | Torunoglu .............. G06F 30/39 716/53 |
| 10,248,663 B1 | 4/2019 | Keisler et al. |
| 10,657,213 B2 * | 5/2020 | Ungar .................... G03F 7/705 |
| 10,733,744 B2 | 8/2020 | Ha et al. |
| 10,740,607 B2 | 8/2020 | Mei |

(Continued)

FOREIGN PATENT DOCUMENTS

| | | |
|---|---|---|
| EP | 3392712 A1 | 10/2018 |
| KR | 1020160100842 A | 8/2016 |
| WO | 2018033363 A1 | 2/2018 |

OTHER PUBLICATIONS

Yu, Yen-Ting et al. "Machine-Learning-Based Hotspot Detection Using Topological Classification and Critical Feature Extraction", IEEE Transactions On Computer-Aided Design of Integrated Circuits and Systems, vol. 34, No. 3, Mar. 2015.*

(Continued)

*Primary Examiner* — Samir A Ahmed

(74) *Attorney, Agent, or Firm* — MLO, a professional corp.

(57) ABSTRACT

Methods for matching features in patterns for electronic designs include inputting a set of pattern data for semiconductor or flat panel displays, where the set of pattern data comprises a plurality of features. Each feature in the plurality of features is classified, where the classifying is based on a geometrical context defined by shapes in a region. The classifying uses machine learning techniques.

12 Claims, 8 Drawing Sheets

(56) References Cited

U.S. PATENT DOCUMENTS

| | | | |
|---|---|---|---|
| 2004/0003357 A1* | 1/2004 | Palusinski | G06F 30/398 |
| | | | 716/52 |
| 2008/0070414 A1 | 3/2008 | Shiraishi | |
| 2014/0341462 A1 | 11/2014 | Sezginer et al. | |
| 2014/0358830 A1 | 12/2014 | Chiang et al. | |
| 2015/0255730 A1 | 9/2015 | Chuang et al. | |
| 2015/0261908 A1 | 9/2015 | Hsieh et al. | |
| 2015/0379185 A1 | 12/2015 | Morisaki et al. | |
| 2016/0132627 A1 | 5/2016 | Tsai et al. | |
| 2016/0163035 A1* | 6/2016 | Chang | G06T 7/0004 |
| | | | 382/149 |
| 2016/0349608 A1 | 12/2016 | Zhang et al. | |
| 2017/0148226 A1 | 5/2017 | Zhang et al. | |
| 2017/0345140 A1* | 11/2017 | Zhang | G06K 9/6271 |
| 2018/0096094 A1 | 4/2018 | Huang et al. | |
| 2018/0173090 A1 | 6/2018 | Wang et al. | |
| 2018/0285510 A1 | 10/2018 | Lutich | |
| 2018/0293721 A1* | 10/2018 | Gupta | G06N 3/0454 |
| 2018/0322234 A1 | 11/2018 | Cao et al. | |
| 2018/0330511 A1* | 11/2018 | Ha | G06K 9/6203 |
| 2019/0171223 A1 | 6/2019 | Liang et al. | |
| 2019/0182280 A1 | 6/2019 | Marca et al. | |
| 2019/0188840 A1* | 6/2019 | Kwon | G06K 9/6271 |
| 2019/0287230 A1 | 9/2019 | Lu et al. | |
| 2020/0073636 A1 | 3/2020 | Cammarota et al. | |
| 2020/0184137 A1 | 6/2020 | Tsutsui et al. | |
| 2020/0201286 A1 | 6/2020 | Fujimura et al. | |
| 2020/0226742 A1* | 7/2020 | Sawlani | H01L 21/67288 |
| 2020/0272865 A1 | 8/2020 | Niewczas et al. | |
| 2020/0294224 A1* | 9/2020 | Shaubi | G06K 9/03 |
| 2020/0327416 A1 | 10/2020 | Baker et al. | |

OTHER PUBLICATIONS

Lin, Yibo "Machine Learning for Yield Learning and Optimization", IEEE International Test Conference (ITC), pp. 1-10, 2018.*

Ding, Duo et al., "Machine Learning based Lithographic Hotspot Detection with Critical-Feature Extraction and Classification",IEEE Xplore, 2009.*

International Search Report dated Jun. 10, 2020 for PCT Patent Application No. PCT/IB2020/051496.

International Search Report dated Jun. 9, 2020 for PCT Patent Application No. PCT/IB2020/051495.

Office Action dated Jan. 8, 2021 for U.S. Appl. No. 16/793,152.

Baranwal et al., "Five Deep Learning Recipes for the Mask Making Industry," SPIE Photomask Technology Conference, Monterey, CA, Sep. 16, 2019, 33 pages.

Baranwal et al., "Five Deep Learning Recipes for the Mask-Making Industry," Photomask Technology 2019, vol. 1148, Oct. 25, 2019, 19 pages, https://doi.org/10.1117/12.2538440.

Pang et al., "Enhancing ILT process window using curvilinear mask patterning: dual mask-wafer simulation—How GPU-accelerated simulation enables applied deep learning for masks and wafers ," SPIE Advanced Lithography Conference, San Jose CA, Feb. 26, 2019, 25 pages.

Chen et al., Design and Acceleration of Convolutional Neural Networks on Modem Architectures, May 8, 2021 [retrieved May 8, 2021 ], report, 23 pages. Retrieved: https://www.jics.tennessee.edu/files/images/recsem-reu/2018/dnn/Report. pdf (Year: 2021).

Lin et al., Data Efficient Lithography Modeling With Transfer Learning and Active Data Selection, Aug. 7, 2018 (1st public dissemination) [rel: May 8, 2021], IEEE Trans on Com-Aid Desi Integral Cir, vol. 38, Issue 10, Oct. 2019, pp. 1900-1913. Retrieved: DOI: 10.1109/TCAD.2018.2864251 (Year: 2018).

Lin et al., Machine Learning for Yield Learning and Optimization, 2018 IEEE International Test Conference, Oct. 29-Nov. 1, 2018 [ retrieved May 8, 2021, 10 pages. Retrieved: https://ieeexplore.ieee.org/abstracl/document/8624733 (Year 2018).

Ma et al., A Machine Learning Based Morphological Classification of 14,245 Radio AGNs Selected from the Best-Heckman Sample, Feb. 12, 2019 [retrieved May 8, 2021], The Astrophysical Journal, vol. 240, No. 2, 21 pages. Retrieved: https://iopscience.iop.org/article/10.384 7 /1538-4365/aaf9a2/meta (Year: 2019).

Notice of Allowance and Fees dated Jul. 28, 2021 for U.S. Appl. No. 16/793,152.

Office Action dated May 14, 2021 for U.S. Appl. No. 16/793,152.

Wetteland, Classification of histological images of bladder cancer using deep learning, thesis, Jun. 2017 [retrieved May 8, 2021], University of Stavanger, Norway, 77 pages. Retrieved: https://uis.brage.unil.no/uis-xmlui/handle/11250/2455555 (Year: 2017).

Office Action dated Dec. 1, 2021 for Austria Patent Application No. A 9073/2020.

* cited by examiner

METHODS AND SYSTEMS TO CLASSIFY FEATURES IN ELECTRONIC DESIGNS

RELATED APPLICATIONS

This application claims priority to U.S. Provisional Patent Application No. 62/810,168, filed on Feb. 25, 2019 and entitled Methods and Systems to Classify Features on Semiconductor or Flat Panel Display Shape Data"; which is hereby incorporated by reference in its entirety for all purposes.

BACKGROUND

The present disclosure is related to lithography, and more particularly to the design and manufacture of a surface which may be a reticle, a wafer, or any other surface, using charged particle beam lithography.

In lithography the lithographic mask or reticle comprises geometric patterns corresponding to the circuit components to be integrated onto a substrate. The patterns used to manufacture the reticle may be generated utilizing computer-aided design (CAD) software or programs. In designing the patterns, the CAD program may follow a set of pre-determined design rules in order to create the reticle. These rules are set by processing, design, and end-use limitations. An example of an end-use limitation is defining the geometry of a transistor in a way in which it cannot sufficiently operate at the required supply voltage. In particular, design rules can define the space tolerance between circuit devices or interconnect lines. The design rules are, for example, used to ensure that the circuit devices or lines do not interact with one another in an undesirable manner. For example, the design rules are used so that lines do not get too close to each other in a way that may cause a short circuit. The design rule limitations reflect, among other things, the smallest dimensions that can be reliably fabricated. When referring to these small dimensions, one usually introduces the concept of a critical dimension. These are, for instance, defined as the important widths or areas of a feature or the important space between two features or important space areas, those dimensions requiring exquisite control. Due to the nature of integrated circuit designs, many patterns in a design are repeated in different locations. A pattern may be repeated hundreds or thousands of times—each copy of the pattern is called an instance. If a design rule violation is found in such a pattern, the hundreds or thousands of violations may be reported—one for each instance of the pattern.

One goal in integrated circuit fabrication by optical lithography is to reproduce the original circuit design on a substrate by use of a reticle, in which the reticle, sometimes referred to as a mask or a photomask, is a surface which may be exposed using charged particle beam lithography. Integrated circuit fabricators are always attempting to use the semiconductor wafer real estate as efficiently as possible. Engineers keep shrinking the size of the circuits to allow the integrated circuits to contain more circuit elements and to use less power. As the size of an integrated circuit critical dimension is reduced and its circuit density increases, the critical dimension of the circuit pattern or physical design approaches the resolution limit of the optical exposure tool used in conventional optical lithography. As the critical dimensions of the circuit pattern become smaller and approach the resolution value of the exposure tool, the accurate transcription of the physical design to the actual circuit pattern developed on the resist layer becomes difficult. To further the use of optical lithography to transfer patterns having features that are smaller than the light wavelength used in the optical lithography process, a process known as optical proximity correction (OPC) has been developed. OPC alters the physical design to compensate for distortions caused by effects such as optical diffraction and the optical interaction of features with proximate features. Resolution enhancement technologies performed with a reticle include OPC and inverse lithography technology (ILT).

OPC may add sub-resolution lithographic features to mask patterns to reduce differences between the original physical design pattern, that is, the design, and the final transferred circuit pattern on the substrate. The sub-resolution lithographic features interact with the original patterns in the physical design and with each other and compensate for proximity effects to improve the final transferred circuit pattern. One feature that is added to improve pattern transference is referred to as "serifs." Serifs are small features that enhance precision or resiliency to manufacturing variation of printing of a particular feature. An example of a serif is a small feature that is positioned on a corner of a pattern to sharpen the corner in the final transferred image. Patterns that are intended to print on the substrate are referred to as main features. Serifs are a part of a main feature. It is conventional to discuss the OPC-decorated patterns to be written on a reticle in terms of main features, that is features that reflect the design before OPC decoration, and OPC features, where OPC features might include serifs, jogs, sub-resolution assist features (SRAFs) and negative features. OPC features are subject to various design rules, such as a rule based on the size of the smallest feature that can be transferred to the wafer using optical lithography. Other design rules may come from the mask manufacturing process or, if a character projection charged particle beam writing system is used to form the pattern on a reticle, from the stencil manufacturing process.

In optical lithography, the manufacture of the desired pattern on the reticle or photomask is a critical step. Since the pattern on the photomask is replicated during the optical lithographic process, there can be no defects on the photomask that will cause a defect to be printed onto the substrate during the optical lithography step. Therefore, newly-manufactured photomasks are inspected to detect such potential defects. Potential defects are further analyzed, to determine if the defect is a real defect, that must be repaired before using the mask in production.

SUMMARY

Methods for matching features in patterns for electronic designs include inputting a set of pattern data for semiconductor or flat panel displays, where the set of pattern data comprises a plurality of features. Each feature in the plurality of features is classified, where the classifying is based on a geometrical context defined by shapes in a region. The classifying uses machine learning techniques.

DETAILED DESCRIPTION OF EMBODIMENTS

Figure 1:
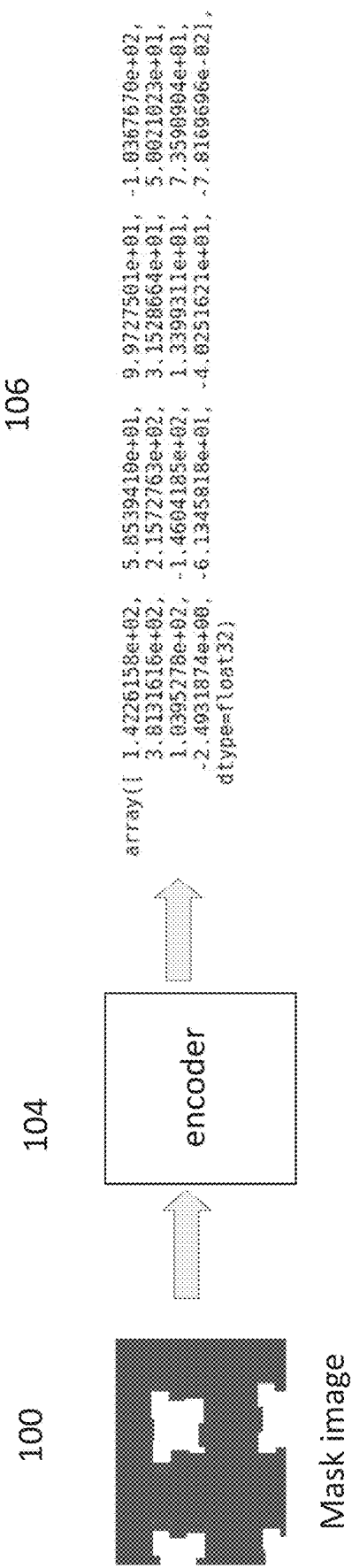
FIG. 1 is representation of image data as compressed encoding.

In the design and manufacture of electronic designs such as integrated circuits and flat panel displays, there are multiple processes in which comparison of the 2-dimensional (2D) shape features in the design, manufactured photomask, or manufactured substrate are useful. Due to the very large number of features in today's designs, the speed of comparison is important. Comparison of compressed data can theoretically be faster than comparison of uncompressed data, because there is less data to compare. However, the time required to create the compressed representation must also be considered. Standard compression techniques are not feasible because they take too long to compute. In U.S. patent application Ser. No. 16/793,152, entitled "Methods and Systems for Compressing Shape Data for Electronic Designs" and which is hereby incorporated by reference, data compression by way of machine learning through a neural network can produce a faster method of compression, as shown in FIG. 1 of the present application. Once a mask image (input 100) is compressed by an encoder 104 derived through neural network-based machine learning, the compressed data 106 (labeled as "encoded image vector") can be used for classification. In the present embodiments, unique classification techniques are described which enhance analysis of compressed data.

The 2-dimensional data in integrated circuit or flat panel display designs is very constrained in the types of features possible, compared to, for example, generalized line art. Similarly, the types of features that are found in scanning electron microscope (SEM) photographs of manufactured photomasks or manufactured substrates is quite constrained. With machine learning techniques, these constraints allow very high classification factors to be achieved.

In some embodiments, autoencoding can be used for classification or categorization. Having more features available in the compressed data 106 in FIG. 1 makes measuring similarity between images simpler by comparing all features. In some embodiments, the present methods remove undifferentiating data from the original input 100 (e.g., a 2D picture or other representation of shapes) and find an encoding that has high information density (more features) so the multi-dimensional categorization space has like things close to each other and unlike things far from each other, without having the total multi-dimensional volume of the whole space being too large. The present methods create a higher density of that total volume, which makes searching in that volume much more efficient. Training pre-computes a network of relationships with "weights" based on frequency of common occurrences. Classification is a very fast evaluation of that pre-computed network to look for intersections which applies the encoder 104 to a given input.

In conventional practices, a geometric rules checker analyzes geometric data (e.g., of mask design or wafer design or other two-dimensional geometric data) and reports errors such as "these shapes are too close to each other relative to the minimum spacing rule" or "this part of this shape is too small relative to the minimum size rule." A term used to describe such errors is "edge placement error" or EPE. When applied to the scale of a semiconductor (or flat panel display) mask—e.g., roughly 130 mm×100 mm with 0.1 nm placement resolution for a semiconductor mask—one of the practical problems is to wade through all the errors reported to figure out which ones to pay attention to. Other reported errors include those detected by XOR, detection by other methods or other error types. All errors are reported against a known set of rules.

There are often 1000s of errors of the "same type," violating the same rule. Once an issue triggers an error, so many instances of similar situations create 1000s of errors that they obscure other errors that are different but which are important to notice. For example, a single rule violation of an instance placed 1000 times may be more severe in certain areas. A classification of similar placements, or geometrical context, in the present disclosure further differentiates the 1000 errors.

The present methods involve classification engines that automatically classify reported errors based on the geometrical context defined by shapes in a region. A region may be, for example, a portion of a mask design. In the present embodiments the process of encoding an image with the assumption that the image is of a mask, wafer, or design shape captures and encodes similarities among the possible shapes, making it possible to compare and classify shapes for a variety of applications. For example, if 2000 errors are reported for any given design, the present classification engines automatically group the errors into "different types" and (potentially in an overlapping way: such as single vs. multiple labeling, where one error can end up in multiple categories). In single label classification, classes are exclusive where each error belongs to one class, whereas in multiple label classification each error can belong to more than one class. These classifications are categorizations of the similarity of the shapes in a region, not an identification of specific error types.

Methods involve inputting a set of pattern data for semiconductor or flat panel displays, where the pattern data comprises a plurality of features. Each feature in the plurality of features is classified into classifications using machine learning techniques. Classification may be based on a geometrical context defined by shapes in a region. A feature in the set of pattern data can be in more than a single classification. The set of pattern data may include a set of questionable spots from mask inspection and/or a set of reported errors from a geometric checker. Methods may also include compressing the input pattern data, where the classifying uses the compressed pattern data.

In some embodiments, the set of pattern data may include simulated mask data that has been enhanced by OPC. A set of simulated contours generated from the simulated mask data is examined for EPE resulting in a set of errors. The addition of the simulated mask data enhanced by OPC and the set of errors to the set of pattern data increase the plurality of features to be classified.

Figure 2A:
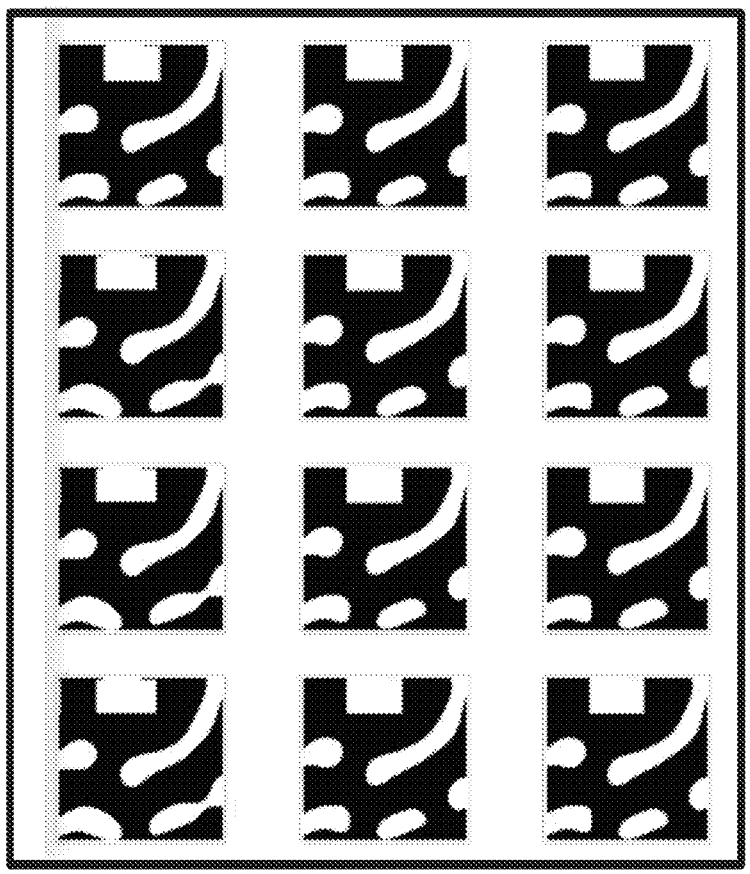
FIGS. 2A-2B show two mask/wafer image error classifications, in accordance with some embodiments.
Figure 2B:
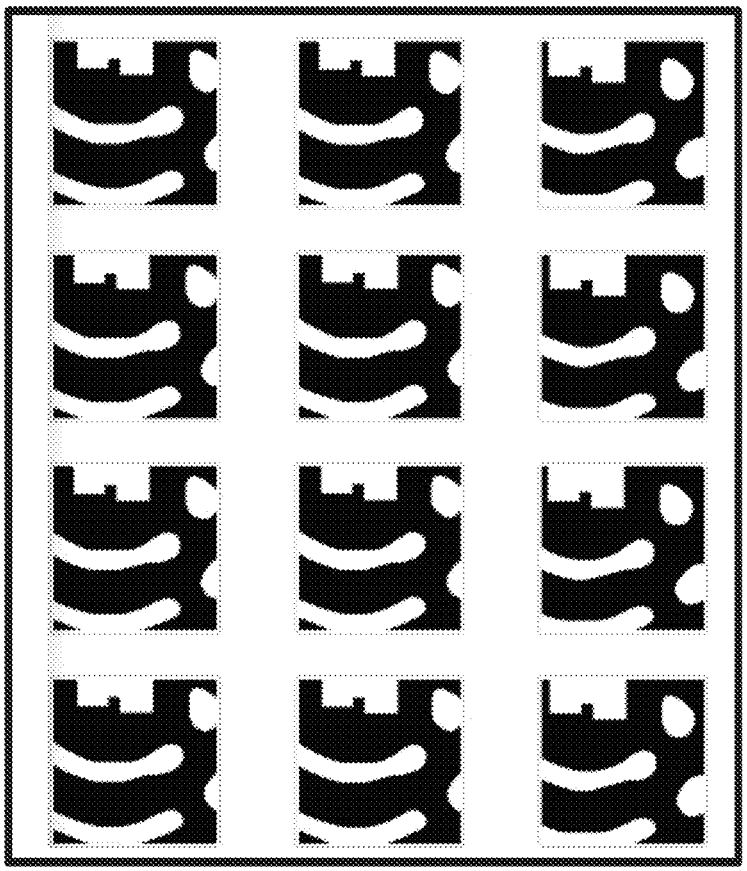

An important part of error classification with machine learning is to auto-encode the 2D contours of design, mask, or wafer shapes. Such "categorization" has been done in Electronic Design Automation before. Typically, though, conventional categorization uses exact matches of rectilinear shapes of CAD designs. In contrast, error classification with machine learning in the present embodiments can identify "similar" configurations of shapes or work in curvilinear space, working on simulated or actual physical pictures of manufactured surfaces in semiconductor wafer or mask or flat panel display or their mask manufacturing spaces. For example, FIG. 2A, shows a set of images that have been categorized in one cluster in accordance with some embodiments, and FIG. 2B is a set of images that have been classified in another cluster. As can be seen, the images within each cluster FIG. 2A or FIG. 2B have features that are similar to each other, but the classification engine has identified that the placement and types of features in the images in FIG. 2A are different from those in FIG. 2B. In some embodiments, compression and/or classification uses an autoencoder. Encoded features from the compression may be vectors.

Output can be categorized or classified based on the input CAD shapes (which are typically rectilinear shapes, but could be curvilinear shapes), or post-OPC shapes that describe what mask shapes will best generate the shapes on the wafer closest to the desired CAD shapes. Post-OPC shapes are typically rectilinear, but embodiments may also include (particularly with output of next generation OPC software) curvilinear shapes as enabled by multi-beam mask writing that does not have the rectangular limits of VSB-based mask writing. Output shapes could also represent simulated curvilinear contours.

Applying the methods of the present disclosure to SEM (scanning electron microscope), pictures of physically manufactured masks or wafers can be used to automatically categorize identified defects. In semiconductor manufacturing, potential defects on masks are identified by mask inspection which takes the picture of the entire mask. That picture is fuzzy and relatively low-resolution but is of the entire mask. The picture is designed to identify questionable spots where further inspection is required. That further inspection is done through much more accurate SEM pictures that are taken and analyzed, using defect inspection SEM machines (as opposed to CD-SEM machines that are designed to measure distances). SEM machines take a very clear picture in detail but can only take 1 µm×1 µm to 10 µm×10 µm order field. Thus, suspected areas are identified in the full-field mask picture taken by inspection, then details of suspected areas are examined in SEM. In the leading-edge nodes, the number of suspected areas identified as well as the number of actual problems on a typical production mask are much larger than it used to be. Ten years ago, maybe 10s of problems on masks were repaired, and masks with too many errors were discarded and re-manufactured. Currently for the leading-edge masks, 100s of problems are common and repaired. The manufacturers no longer choose to re-manufacture faulty masks, because the likelihood of the new one having also 100s of (different) problems is too high. Repairing of defects is unique to mask manufacturing; wafers are not repaired. Masks are worth repairing because a given error on the mask are on every wafer that mask produces.

With machine learning based classification in the present embodiments, if a SEM photo of one or a few questionable spots shows that no actual problem—i.e. defect—exists, then SEM imaging of other questionable spots in the same category can be avoided. This can greatly reduce the time required to inspect the mask.

Figure 3:
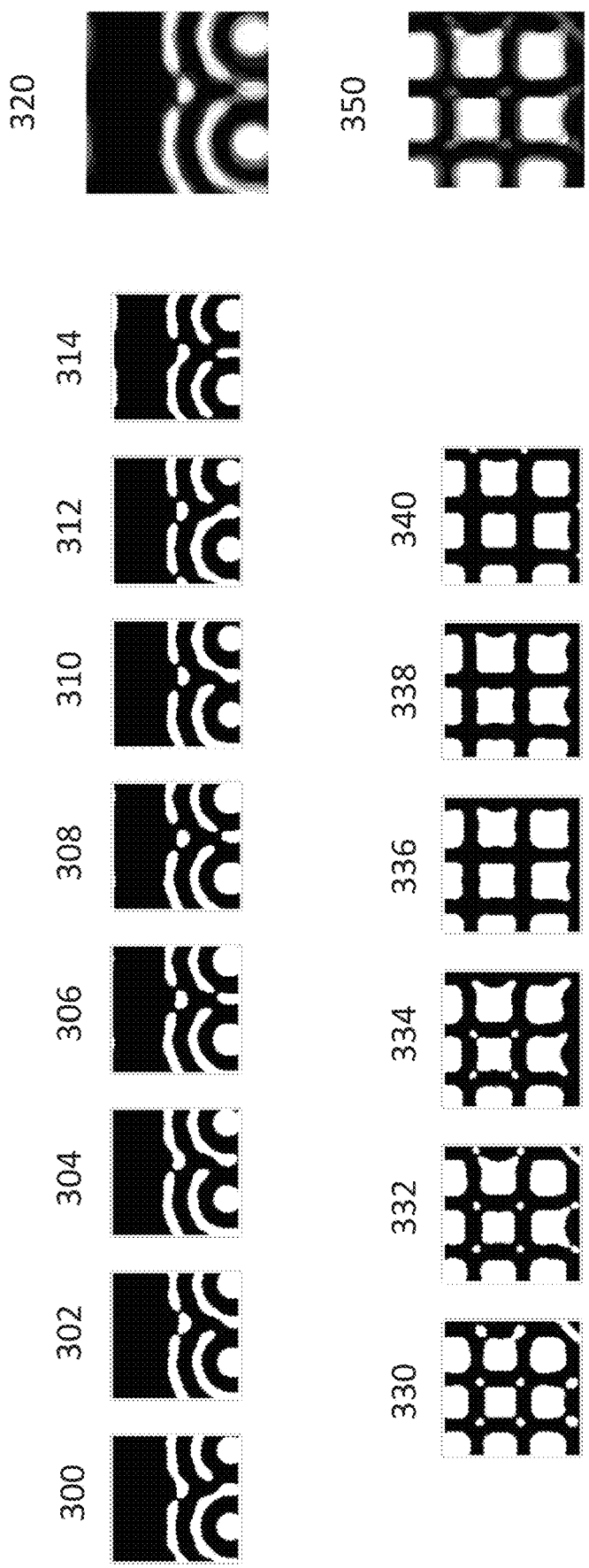
FIG. 3 shows mean images calculated from features in a cluster, in accordance with some embodiments.
Figure 4A:
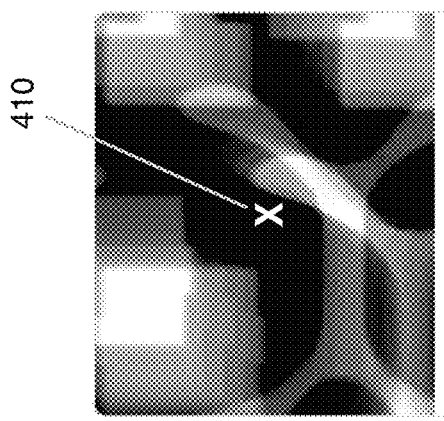
FIGS. 4A-4F show example mean images used to measure clustering quality based on blurriness, in accordance with some embodiments.
Figure 4B:
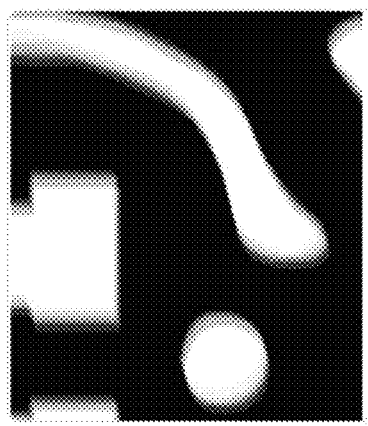
Figure 4C:
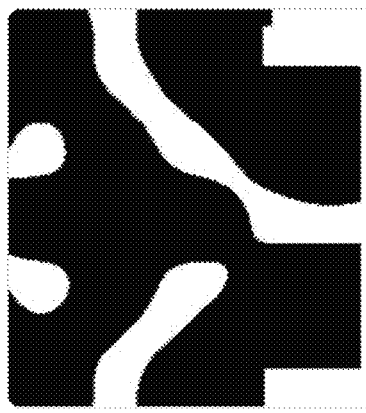
Figure 4D:
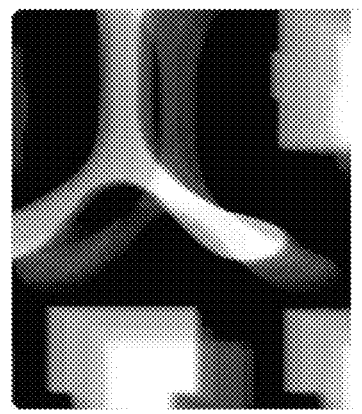
Figure 4E:
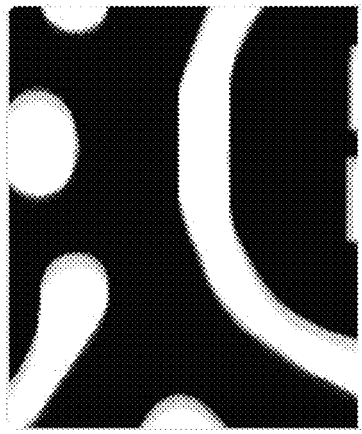
Figure 4F:
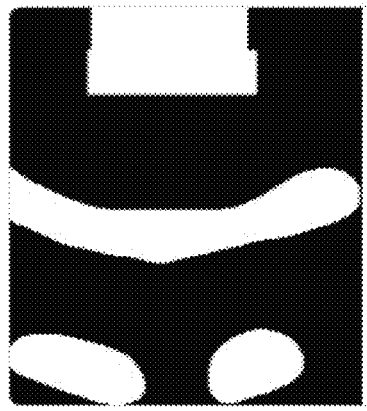

In some embodiments the quality of a classification or of a cluster of features (i.e., a classification is a cluster of features) can be determined by creating a mean cluster image as shown in FIG. 3, where example mean image 320 for clusters containing images 300, 302, 304, 306, 308, 310, 312, 314 and mean image 350 for clusters containing images 330, 332, 334, 336, 338, 340 are shown. The amount of apparent visual blurriness in the mean cluster images 320 and 350 indicates the variation in the different features in the classification or the cluster of features. More blurriness indicates a larger variation as shown in FIG. 4A-4F, where the amount of variation in FIGS. 4A and 4D is less than FIGS. 4B and 4E, which is less than FIGS. 4C and 4F. In some embodiments, a Gaussian filter is applied to the center of an image (e.g., center 410 in FIG. 4A) to give preference to features around the center. These preferred features are used for autoencoding followed by a density-based spatial cluster of applications with noise (DBSCAN) based clustering algorithm.

Figure 5:
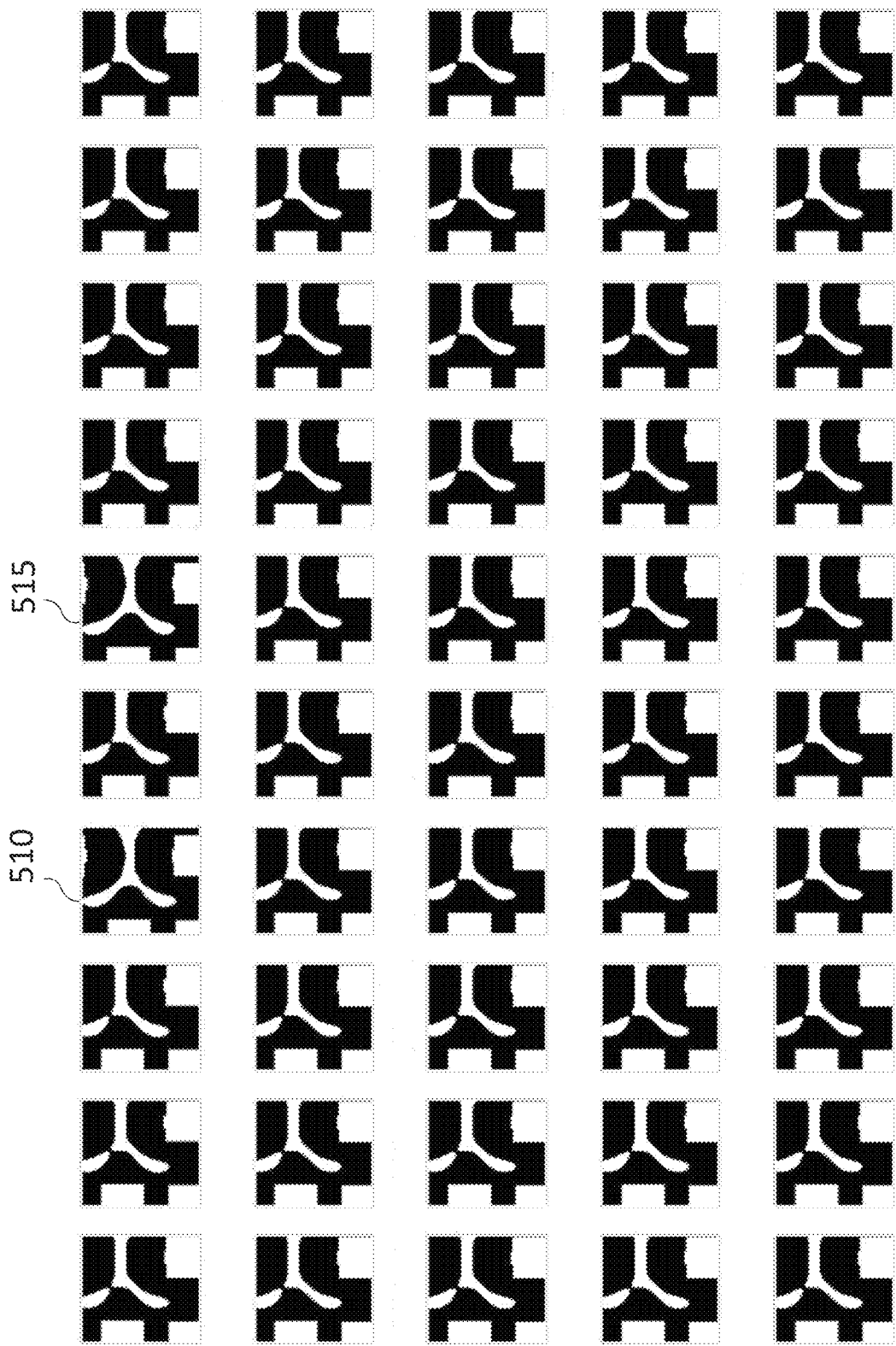
FIG. 5 shows features in a cluster sorted by distance, in accordance with some embodiments.

In some embodiments, the quality of a classification or cluster of features is further characterized by determining a distance metric for each feature in the classification, where the distance metric indicates the deviation of the feature from mean cluster image. In some embodiments, the distance metric is measured using cosine distance of the features within the classification. In FIG. 5, features in the classification are sorted by the calculated distance metric, and features with the largest distance have a higher priority for distinction. This assists in identifying slight variations by giving priority to features that might be different. For example, images 510 and 515 in FIG. 5 have extraneous features along the top-right edge of the images compared to the other images in FIG. 5. Errors with higher priority may need separate inspection. If higher priority features are determined to represent a different error, they may be fed back into the process to improve future classification.

Figure 6:
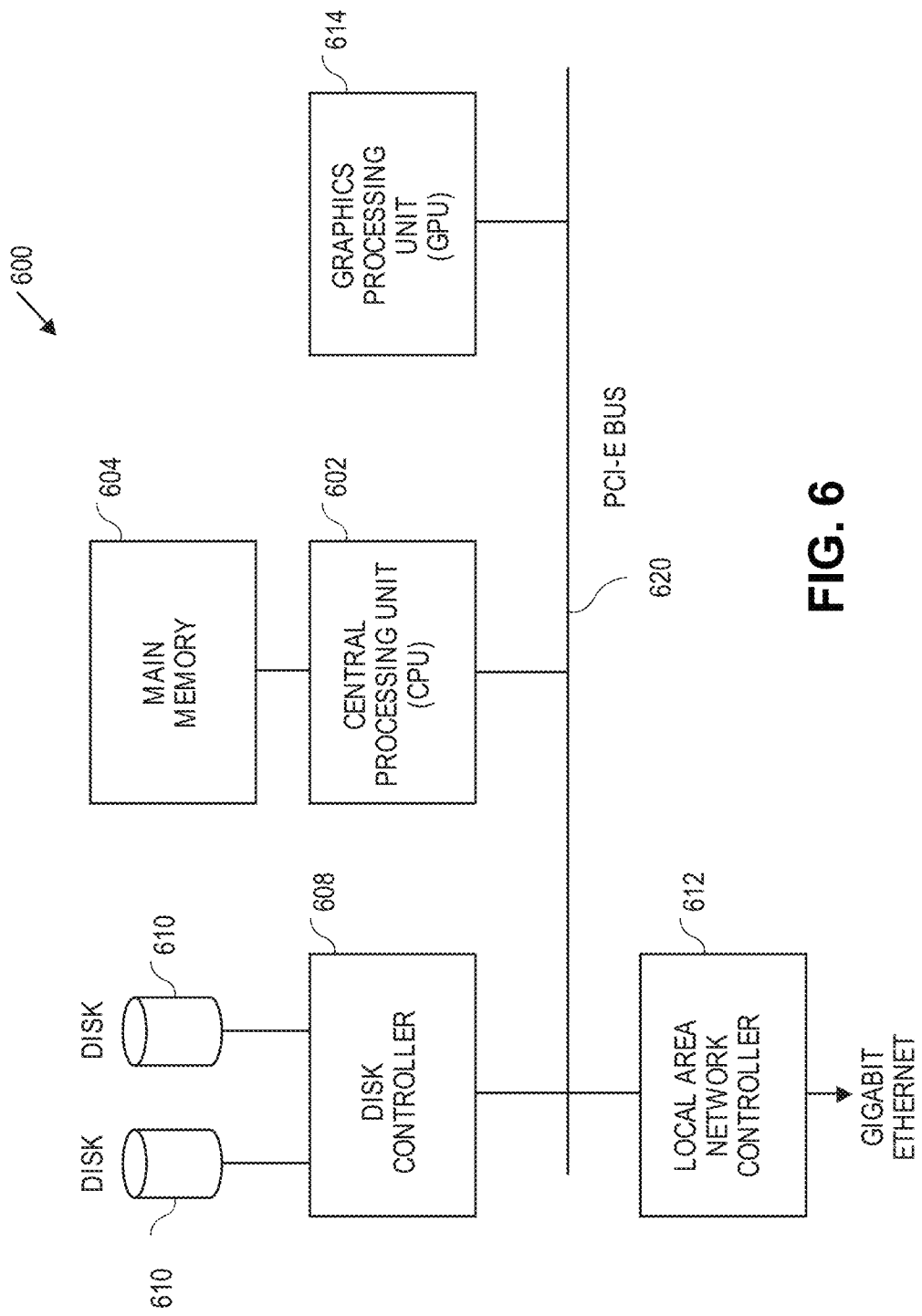
FIG. 6 is a schematic of a GPU system diagram, in accordance with some embodiments.

FIG. 6 illustrates an example of a computing hardware device 600 that may be used to perform the calculations described in this disclosure. Computing hardware device 600 comprises a central processing unit (CPU) 602, with attached main memory 604. The CPU may comprise, for example, eight processing cores, thereby enhancing performance of any parts of the computer software that are multi-threaded. The size of main memory 604 may be, for example, 64 G-bytes. The CPU 602 is connected to a Peripheral Component Interconnect Express (PCIe) bus 620. A graphics processing unit (GPU) 614 is also connected to the PCIe bus. In computing hardware device 600 the GPU 614 may or may not be connected to a graphics output device such as a video monitor. If not connected to a graphics output device, GPU 614 may be used purely as a high-speed parallel computation engine. The computing software may obtain significantly-higher performance by using the GPU for a portion of the calculations, compared to using CPU 602 for all the calculations. The CPU 602 communicates with the GPU 614 via PCIe bus 620. In other embodiments (not illustrated) GPU 614 may be integrated with CPU 602, rather than being connected to PCIe bus 620. Disk controller 608 may also be attached to the PCIe bus, with, for example, two disks 610 connected to disk controller 608. Finally, a local area network (LAN) controller 612 may also be attached to the PCIe bus, and provides Gigabit Ethernet (GbE) connectivity to other computers. In some embodiments, the computer software and/or the design data are stored on disks 610. In other embodiments, either the computer programs or the design data or both the computer programs and the design data may be accessed from other computers or file serving hardware via the GbE Ethernet.

Figure 7:
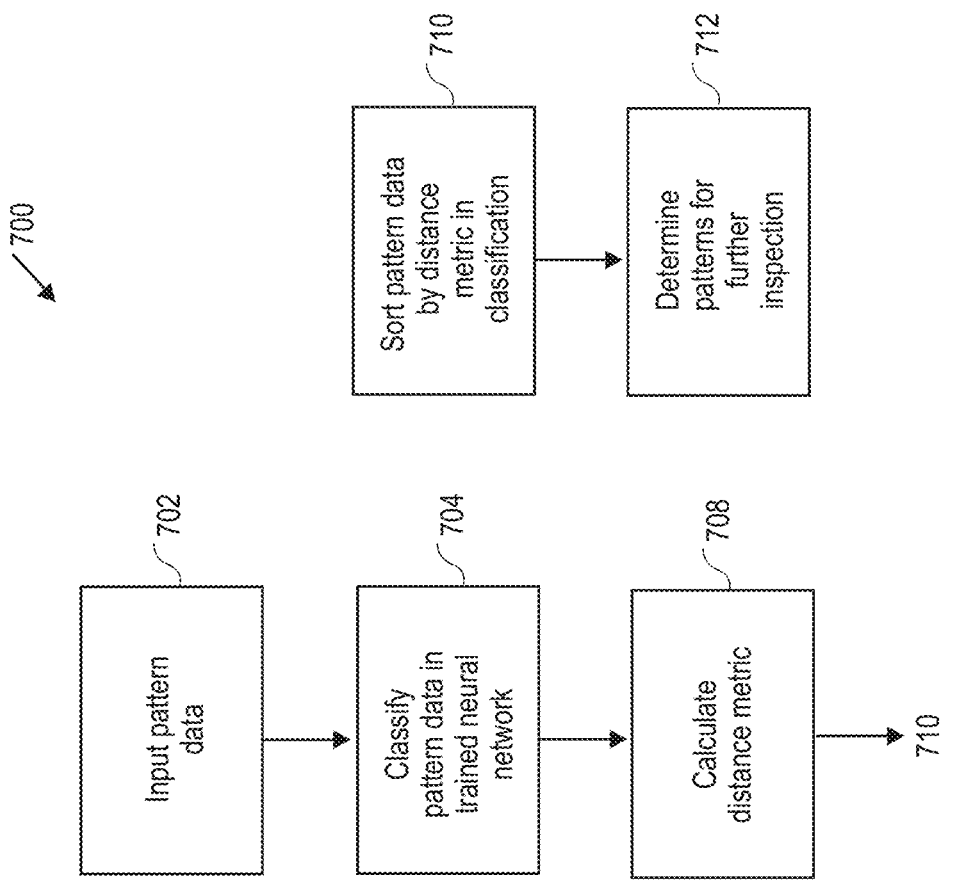
FIG. 7 is a flowchart of methods for matching features in a pattern, in accordance with some embodiments.

FIG. 7 is a flowchart 700 representing methods for matching features in electronic designs, such as patterns for semiconductor or flat panel displays. The flow 700 may use, for example, an autoencoder that has already been trained with patterns for semiconductor or flat panel displays. Flow 700 begins with step 702 of inputting a set of pattern data, where the set of pattern data may be patterns for semiconductor or flat panel displays. The set of pattern data includes a plurality of features. In some embodiments the set of pattern data are SEM images or simulated SEM images, and the set of pattern data may include a set of questionable spots from mask inspection. Step 704 involves using a trained neural network on the set of pattern data to classify the set of pattern data. Each feature in the plurality of features is classified, where the classifying is based on a geometrical context defined by shapes in a region and where the classifying uses machine learning techniques. In some embodiments of FIG. 7, the set of pattern data comprises a set of reported errors from a geometric checker. In some embodiments, the methods include determining (i.e., calculating) a distance metric in step 708 for each feature in a classification created by the classifying of step 704. The distance metric may be measured, for example, using a cosine distance of the features within the classification. Step 710 involves sorting the pattern data in each classification. In step 712 a determination of a set of patterns for further inspection is made based on the sorting of the pattern data in each classification.

Figure 8:
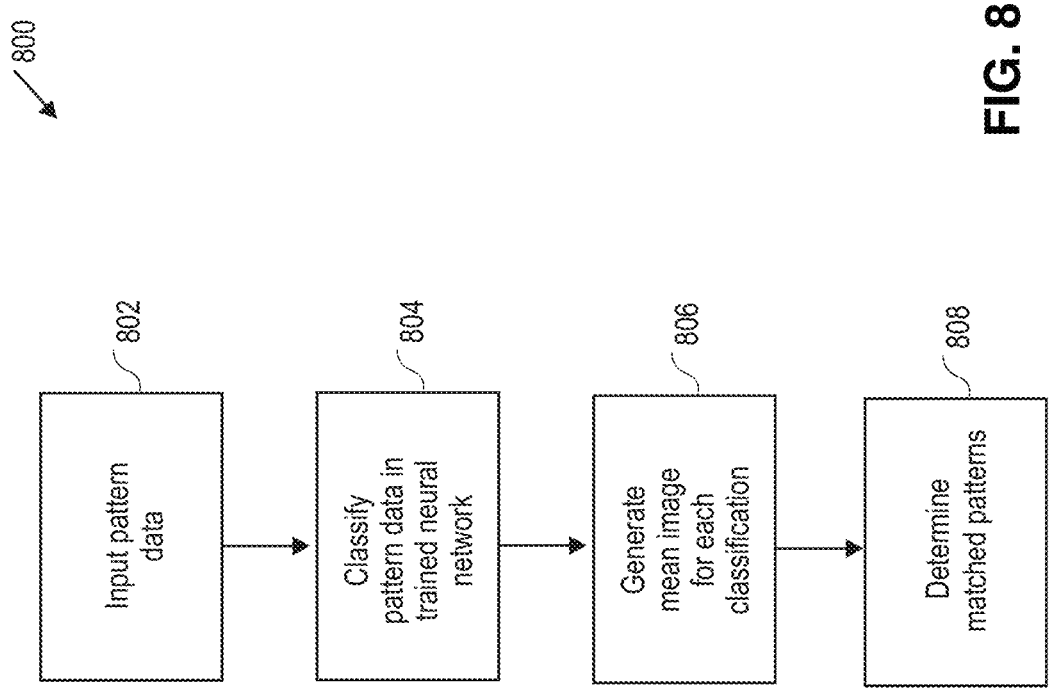
FIG. 8 is a flowchart representing methods for matching features in a pattern using mean images for each classification, in accordance with some embodiments.

FIG. 8 is a flowchart 800 representing methods for determining optimal OPC patterns for electronic designs, such as a semiconductor pattern or flat panel display. The flow 800 may use, for example an autoencoder that has already been trained with patterns for semiconductor or flat panel displays. Flow 800 begins with step 802 of inputting a set of pattern data, where the set of pattern data includes a plurality of features. The set of pattern data may be simulated mask data enhanced by OPC (i.e., OPC patterns for a mask design). Step 804 involves using a trained neural network on the set of pattern data to classify the set of pattern data. Each feature in the plurality of features is classified, where the classifying is based on a geometrical context defined by shapes in a region and where the classifying uses machine learning techniques. In some embodiments of FIG. 8, the methods include step 806 of determining (i.e., generating) a mean image for each classification created by the classifying and a variation among the features in the classification. In step 808, determination of matching patterns can be made using the classifications, where the matched features can be used to, for example, determine an optimal OPC method for a mask design (e.g., determining groupings with less or the least amount of deviation, as indicated by the blurriness in relation to FIGS. 4A-4F).

In embodiments of FIGS. 7 and 8, the methods include compressing, such as by using an autoencoder, the input set of pattern data into compressed pattern data, where the classifying (e.g., steps 704 or 804) uses the compressed pattern data. The compressing creates encoded features, where each encoded feature created by the autoencoder may be an element in a vector. In embodiments of FIGS. 7 and 8, the classifying uses an autoencoder. The classifying may allow a feature in the plurality of features to be in more than one classification. In embodiments of FIGS. 7 and 8, the methods further include applying a Gaussian filter to the center of an image to give preference to features around the center.

While the specification has been described in detail with respect to specific embodiments, it will be appreciated that those skilled in the art, upon attaining an understanding of the foregoing, may readily conceive of alterations to, variations of, and equivalents to these embodiments. These and other modifications and variations to the present methods may be practiced by those of ordinary skill in the art, without departing from the scope of the present subject matter, which is more particularly set forth in the appended claims. Furthermore, those of ordinary skill in the art will appreciate that the foregoing description is by way of example only, and is not intended to be limiting. Steps can be added to, taken from or modified from the steps in this specification without deviating from the scope of the invention. In general, any flowcharts presented are only intended to indicate one possible sequence of basic operations to achieve a function, and many variations are possible. Thus, it is intended that the present subject matter covers such modifications and variations as come within the scope of the appended claims and their equivalents.

What is claimed is:

1. A method for matching features in patterns for electronic designs, the method comprising:
   inputting a set of pattern data for semiconductor or flat panel displays, wherein the set of pattern data comprises a plurality of features;
   classifying each feature in the plurality of features, wherein the classifying is based on a geometrical context defined by shapes in a region and wherein the classifying uses machine learning techniques;
   creating a classification, the classification being a cluster of features from the classifying;
   determining a mean cluster image from the classification; and
   calculating a distance metric for each feature in the classification, wherein the distance metric indicates a deviation of each feature in the classification from the mean cluster image.

2. The method of claim 1, further comprising compressing the input set of pattern data into compressed pattern data, wherein the classifying uses the compressed pattern data.

3. The method of claim 2 wherein the compressing uses an autoencoder.

4. The method of claim 3 wherein each encoded feature created by the autoencoder is an element in a vector.

5. The method of claim 1 wherein the classifying uses an autoencoder.

6. The method of claim 1 wherein the classifying allows a feature in the plurality of features to be in more than one classification.

7. The method of claim 1 wherein the set of pattern data comprises a set of questionable spots from mask inspection.

8. The method of claim 1 wherein the set of pattern data comprises simulated mask data enhanced by optical proximity correction (OPC).

9. The method of claim 1 wherein the set of pattern data comprises a set of reported errors from a geometric checker.

10. The method of claim 1, wherein the distance metric is measured using a cosine distance of the features in the plurality of features within the classification.

11. The method of claim 1, further comprising applying a Gaussian filter to a center of an image to give preference to features around the center.

12. The method of claim 1, further comprising sorting the features in the classification by the distance metric, wherein the features in the classification with a largest distance have a higher priority for distinction.

* * * * *